US007103878B2

(12) United States Patent
Fahs et al.

(10) Patent No.: US 7,103,878 B2
(45) Date of Patent: Sep. 5, 2006

(54) METHOD AND SYSTEM TO INSTRUMENT VIRTUAL FUNCTION CALLS

(75) Inventors: Brian Fahs, Champaign, IL (US); Robert Hundt, Santa Clara, CA (US); Tara Krishnaswamy, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 625 days.

(21) Appl. No.: 10/020,631

(22) Filed: Dec. 13, 2001

(65) Prior Publication Data

US 2003/0115584 A1 Jun. 19, 2003

(51) Int. Cl.
*G06F 9/44* (2006.01)
*G06F 9/45* (2006.01)

(52) U.S. Cl. ...................................... 717/130; 717/141

(58) Field of Classification Search ........ 717/100–169; 701/1; 709/320; 707/201; 713/213
See application file for complete search history.

(56) References Cited

U.S. PATENT DOCUMENTS

| | | | | | |
|---|---|---|---|---|---|
| 5,297,284 | A * | 3/1994 | Jones et al. | ................. | 717/137 |
| 5,327,562 | A * | 7/1994 | Adcock | ...................... | 717/141 |
| 5,410,705 | A * | 4/1995 | Jones et al. | ................. | 717/168 |
| 5,560,013 | A * | 9/1996 | Scalzi et al. | ................ | 717/138 |
| 5,632,034 | A * | 5/1997 | O'Farrell | .................... | 717/140 |
| 5,790,858 | A * | 8/1998 | Vogel | ......................... | 717/130 |
| 5,828,883 | A * | 10/1998 | Hall | .......................... | 717/133 |
| 5,953,534 | A * | 9/1999 | Romer et al. | ............... | 717/138 |
| 6,026,235 | A * | 2/2000 | Shaughnessy | ............... | 717/127 |
| 6,175,956 | B1 * | 1/2001 | Hicks et al. | ................ | 717/114 |
| 6,182,282 | B1 * | 1/2001 | Stoodley et al. | ............ | 717/116 |
| 6,263,491 | B1 * | 7/2001 | Hunt | .......................... | 717/130 |
| 6,381,735 | B1 * | 4/2002 | Hunt | .......................... | 717/158 |
| 6,446,259 | B1 * | 9/2002 | Brett | .......................... | 717/165 |
| 6,487,714 | B1 * | 11/2002 | Azagury et al. | ............ | 717/116 |
| 6,675,377 | B1 * | 1/2004 | Tanaka | ....................... | 717/152 |
| 6,760,902 | B1 * | 7/2004 | Ott | ............................ | 717/113 |
| 6,941,545 | B1 * | 9/2005 | Reese et al. | ................ | 717/130 |
| 6,954,923 | B1 * | 10/2005 | Yates et al. | ................. | 717/130 |
| 2002/0032804 | A1 * | 3/2002 | Hunt | .......................... | 709/320 |
| 2002/0049963 | A1 * | 4/2002 | Beck et al. | ................. | 717/130 |
| 2002/0072830 | A1 * | 6/2002 | Hunt | ............................ | 701/1 |
| 2002/0095661 | A1 * | 7/2002 | Angel et al. | ................ | 717/130 |

OTHER PUBLICATIONS

Hollingsworth et al., MDL: a language and compiler for dynamic program instrumentation, Parallel Architectures and Compilation Techniques., 1997. Proceedings. 1997 International Conference on, Nov. 10-14, 1997, IEEE, pp. 201-212.*

(Continued)

*Primary Examiner*—Wei Zhen
*Assistant Examiner*—Satish S. Rampuria

(57) ABSTRACT

A method and system for analyzing a virtual function. In one embodiment, the present invention determines whether a virtual table exists for a virtual function, and determines a call type for the virtual function. In the present embodiment, provided the virtual table is located, the present invention replaces an existing address for the virtual function with a new address such that the new address points to instrumentation code. In this embodiment, upon a call to the virtual function, the present invention loads the new address from the virtual table such that execution is directed to the instrumentation code. The present embodiment continues execution and executes the instrumentation code such that control is delivered to the instrumentor.

16 Claims, 8 Drawing Sheets

OTHER PUBLICATIONS

Sloane, Generating dynamic program analysis tools, Software Engineering Conference, 1997. Proceedings. 1997 Australian, Sep. 29-Oct. 2, 1997,IEEE, pp. 166-173.*

Rawnsley et al., A virtual instrument bus using network programming, IEEE, May 1997 pp. 694-697 vol 1.*

Kang et al., The method of developing Virtual Instrument Platform, IEEE, Sep. 2000 pp. 64-67.*

Spoelder et al., Virtual instrumentation: a survey of standards and their interrelation, IEEE, May 1997 pp. 676-681 vol. 1.*

* cited by examiner

METHOD AND SYSTEM TO INSTRUMENT VIRTUAL FUNCTION CALLS

TECHNICAL FIELD

The present claimed invention relates to instrumentation of a computer program. More specifically, the present claimed invention relates to instrumenting of virtual functions.

BACKGROUND ART

Over recent years, the computing community developed a strong set of tools and methods used to analyze and monitor run-time behavior of a program. One type of performance analysis is referred to as instrumentation. Measurements such as basic-block coverage and function invocation counting can be accurately made using instrumentation. One specific type of code instrumentation is referred to as dynamic binary instrumentation. Dynamic binary instrumentation allows program instructions to be changed on-the-fly. Additionally, dynamic binary instrumentation, as opposed to static instrumentation, is performed at run-time of a program and only instruments those parts of an executable that are actually executed. This minimizes the overhead imposed by the instrumentation process itself. Furthermore, performance analysis tools based on dynamic binary instrumentation require no special preparation of an executable such as, for example, a modified build or link process.

Certain modern programming languages such as, for example, C++ offer the ability to inherit so called derived objects from other base objects. This concept is commonly known as inheritance in the object oriented programming domain. Often, these base and/or derived objects use what are known as virtual functions. Hence, it is possible in certain instances to make a call to a virtual function. To accomplish this, the compiler generates an array of function pointers, known as a virtual table, for each object type that contains at least one virtual function. During the virtual function call, this virtual table is indexed to obtain a function pointer, and then an indirect call is made using that function pointer. Such tables must be created because the actual function call made may not be determinable at compile time. Additionally, it is not possible, at present, to readily instrument or analyze such virtual function calls.

Furthermore, programmers are often interested in deciphering the type of call which is made to a function such as, for example, a virtual function. More specifically, various function call types such as, for example, direct function calls, indirect function calls, and virtual function calls have differing costs associated therewith. That is, the various function calls differ in terms of the cycles and/or instructions executed in performing the function call. Unfortunately, at present, there is no current method for determining the call type for a virtual function.

Thus, a need has arisen for a method and system for analyzing a virtual function including determining the type of call made to the virtual function.

DISCLOSURE OF THE INVENTION

The present invention provides a method and system for method and system for instrumenting a virtual function including determining the type of call made to the virtual function.

Specifically, in one method embodiment, the present invention determines a call type for a virtual function. The present embodiment then locates a virtual table corresponding to a virtual function and replaces an existing address for the virtual function with a new address for the virtual function in the virtual table. In this embodiment, the new address points to instrumentation code. Upon a call to the virtual function, the present embodiment then loads the new address from the virtual table such that execution is directed to the instrumentation code. The present embodiment continues execution and executes the instrumentation code and delivers control to an instrumenting application.

These and other technical advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining", "instrumenting", "overwriting", "executing", "performing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

Figure 1:
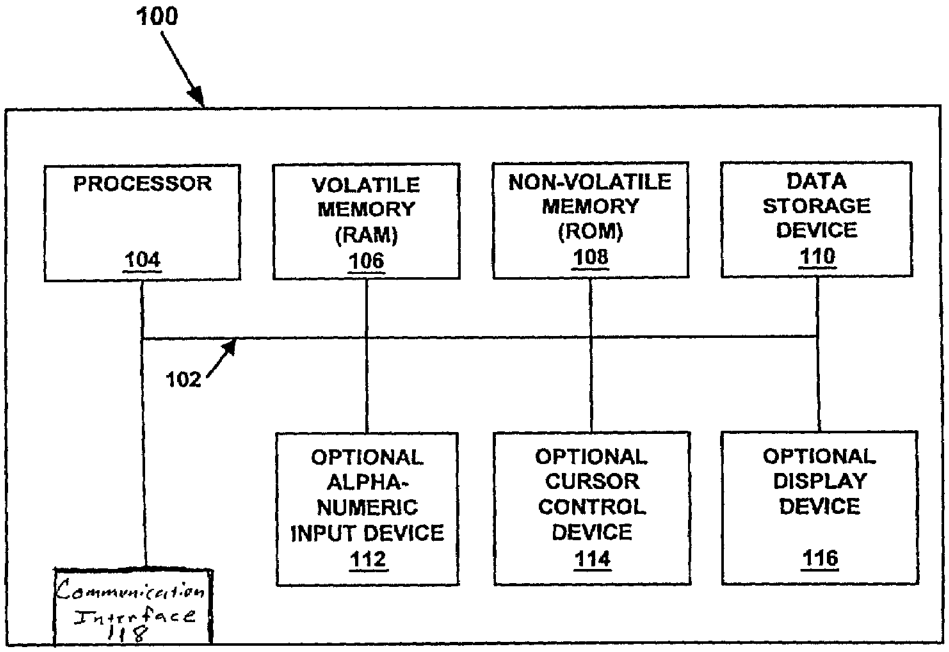
FIG. 1 is a schematic diagram of an exemplary computer system used to perform steps of the present method in accordance with various embodiments of the present claimed invention.

With reference now to FIG. 1, portions of the present method and system are comprised of computer-readable and computer-executable instructions which reside, for example, in computer-usable media of a computer system. FIG. 1 illustrates an exemplary computer system 100 used in accordance with one embodiment of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity. Additionally, portions of the present embodiment are well suited to operating in conjunction with various mobile clients such as, for example, a cell phone, personal digital assistant (PDA), laptop computer, pager, and the like.

System 100 of FIG. 1 includes an address/data bus 102 for communicating information, and a central processor unit 104 coupled to bus 102 for processing information and instructions. As an example, central processor unit 104 may be an IA-64 microprocessor architecture by Intel Corporation of Santa Clara, Calif. System 100 also incudes data storage features such as a computer usable volatile memory 106, e.g. random access memory (RAM), coupled to bus 102 for storing information and instructions for central processor unit 104. System 100 also includes computer usable non-volatile memory 108, e.g. read only memory (ROM), coupled to bus 102 for storing static information and instructions for the central processor unit 104. Such static information is comprised, in one embodiment, of commands for configuration and initial operations of computer system 100. Computer system 100 also includes a data storage unit 110 (e.g., a magnetic or optical disk and disk drive) coupled to bus 102 for storing information and instructions.

System 100 of the present invention also includes an optional alphanumeric input device 112 including alphanumeric and function keys coupled to bus 102 for communicating information and command selections to central processor unit 104. System 100 also optionally includes an optional cursor control device 114 coupled to bus 102 for communicating user input information and command selections to central processor unit 104. System 100 of the present embodiment also includes an optional display device 116 coupled to bus 102 for displaying information. System 100 of the present embodiment also includes a communication interface 118 which enables computer system 100 to interface with other computers or devices. In one embodiment, communication 118 is, for example, a modem, an integrated services digital network (ISDN) card or the like, a local area network (LAN) port, etc. Those skilled in the art will recognize that modems or various types of network interface cards (NICs) typically provide data communications via telephone lines, while a LAN port provides data communications via a LAN. Communication interface 118 of computer system 100 may also enable wireless communications. Furthermore, communication interface 118 may enable communication with other computers or devices through one or more networks. For example, computer system 100, using communication interface 118, may communicate to the "Internet."

Computer system 100 may be used to implement the techniques described below. In various embodiments, processor 104 performs the steps of the techniques by executing instructions brought to RAM 106. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 104 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 104 are in the form of one or more software programs and are initially stored in a CD-ROM being interfaced with computer system 100. Computer system 100 loads these instructions in RAM 106, executes some instructions, and sends some instructions via communication interface 118, a modem, and a telephone line to a network, the Internet, etc. A remote computer, receiving data through a network cable, executes the received instructions and sends the data to computer system 100 to be stored in storage device 110.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the present invention is found below.

General Method and System for Instrumenting a Virtual Function

Figure 2:
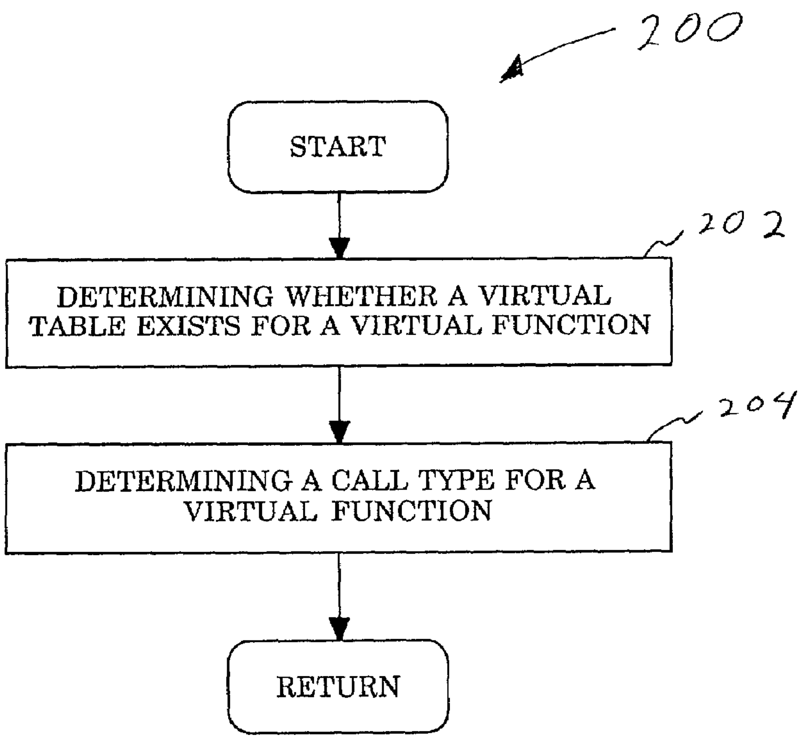
FIG. 2 is a flow chart of steps performed to determine a call type of a virtual function in accordance with one embodiment of the present claimed invention.

With reference next to flow chart 200 of FIG. 2 and to FIG. 1, exemplary steps used by the various embodiments of present invention are illustrated. Flow chart 200 includes processes of the present invention which, in one embodiment, are carried out by a processor under the control of computer-readable and computer-executable instructions. The computer-readable and computer-executable instructions reside, for example, in data storage features such as computer usable volatile memory 106, computer usable non-volatile memory 108, and/or data storage device 110 of FIG. 1. In one embodiment, the computer-readable and computer-executable instructions are used to control or operate in conjunction with, for example, processor 104 of FIG. 1.

With reference again to FIG. 2, steps performed in accordance with one embodiment of the present invention are shown. Although specific steps are disclosed in flow chart 200 of FIG. 2, such steps are exemplary. That is, the present invention is well suited to performing various other steps or variations of the steps recited in FIG. 2. At step 202, the present embodiment, determines whether a virtual table exists for a virtual function. More specifically, in one embodiment, an instrumenting process (instrumentor) monitors a target process using, for example, the debug interface. In this embodiment, the instrumentor monitors the target process for mainly two events: the functions invoked in the target process; and shared modules getting loaded and/or unloaded. Since most compilers maintain virtual table information in the symbol table, in the present embodiment, the instrumentor reads the entire symbol table and knows the exact location of all virtual tables when the module is loaded.

Referring still to step 202, in one approach, the instrumenting application (i.e. the instrumentor) is comprised of the Caliper application by Hewlett-Packard Company of Palo Alto, Calif. The present invention is, however, well suited to use with various other instrumenting applications. Also, in one embodiment, processor 104 of FIG. 1 in conjunction with instructions, residing, for example, in RAM 106, ROM 108, and/or data storage device 110, comprise an apparatus which operates to perform step 202.

With reference next to step 204, the present embodiment determines the call type for the virtual function. That is, by locating a virtual table, the present embodiment establishes that the virtual function can be called by a virtual function call. If there is no virtual table corresponding to the virtual function, the present embodiment establishes that the virtual function is called by a non-virtual call (i.e. a direct function call or an indirect function call). The present invention is, however, well suited to use with various other instrumenting applications. Also, in one embodiment, processor 104 of FIG. 1 in conjunction with instructions, residing, for example, in RAM 106, ROM 108, and/or data storage device 110, comprise an apparatus which operates to perform step 204. Thus, the present embodiment provides a method and system for determining the type of call made to the virtual function.

Figure 3:
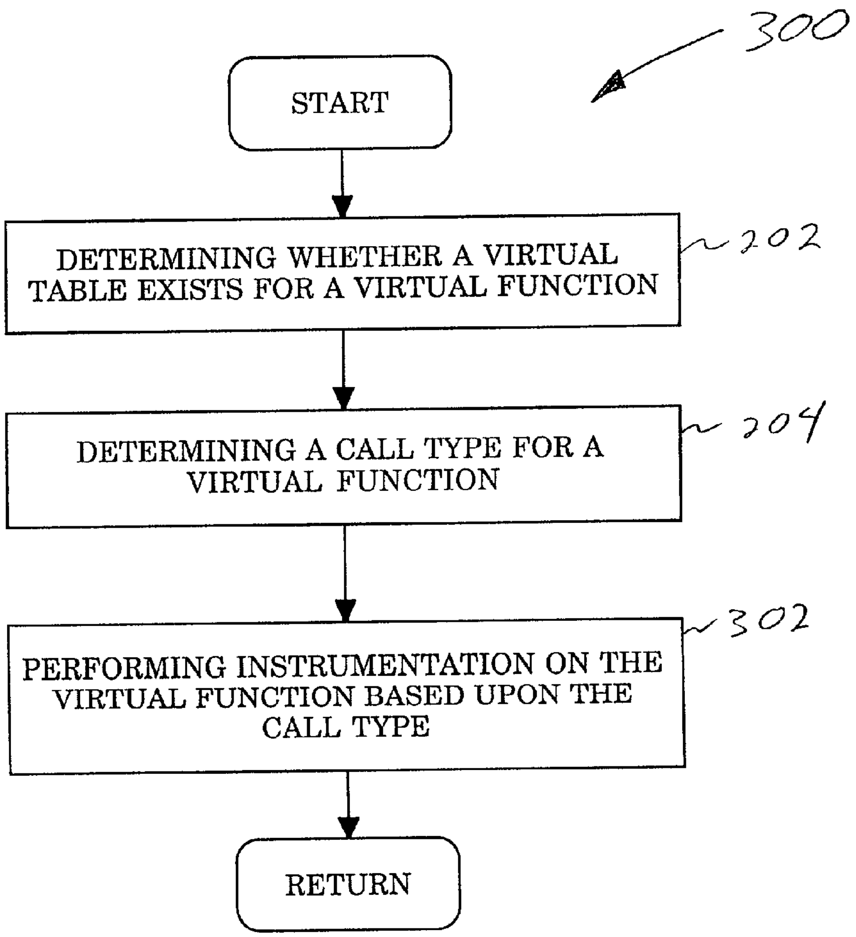
FIG. 3 is a flow chart of steps performed in performing instrumentation of a virtual function in accordance with one embodiment of the present claimed invention.

With reference now to FIG. 3, a flow chart 300 of steps performed in accordance with another embodiment of the present invention is shown. The method of the present embodiment includes steps 202 and 204 of FIG. 2. These steps were described above in detail in conjunction with the description of FIG. 2, and are not repeated herein for purposes of brevity and clarity. The method of the present embodiment as described in FIG. 3 also includes new step 302. At step 302, the present embodiment, performs instrumentation on said virtual function based upon the call type determined in steps 202 and 204. In one embodiment, if the call type is determined to be non-virtual (i.e. a direct function call or an indirect function call), the present embodiment performs a conventional instrumentation process upon the virtual function being called. On the other hand, if the call to the virtual function is determined to be a virtual function call, the present embodiment performs a novel instrumentation process. Various embodiments of the novel instrumentation process performed by the present invention are described below in detail. In one embodiment, processor 104 of FIG. 1 in conjunction with instructions, residing, for example, in RAM 106, ROM 108, and/or data storage device 110, comprise an apparatus which operates to perform step 302.

Figure 4:
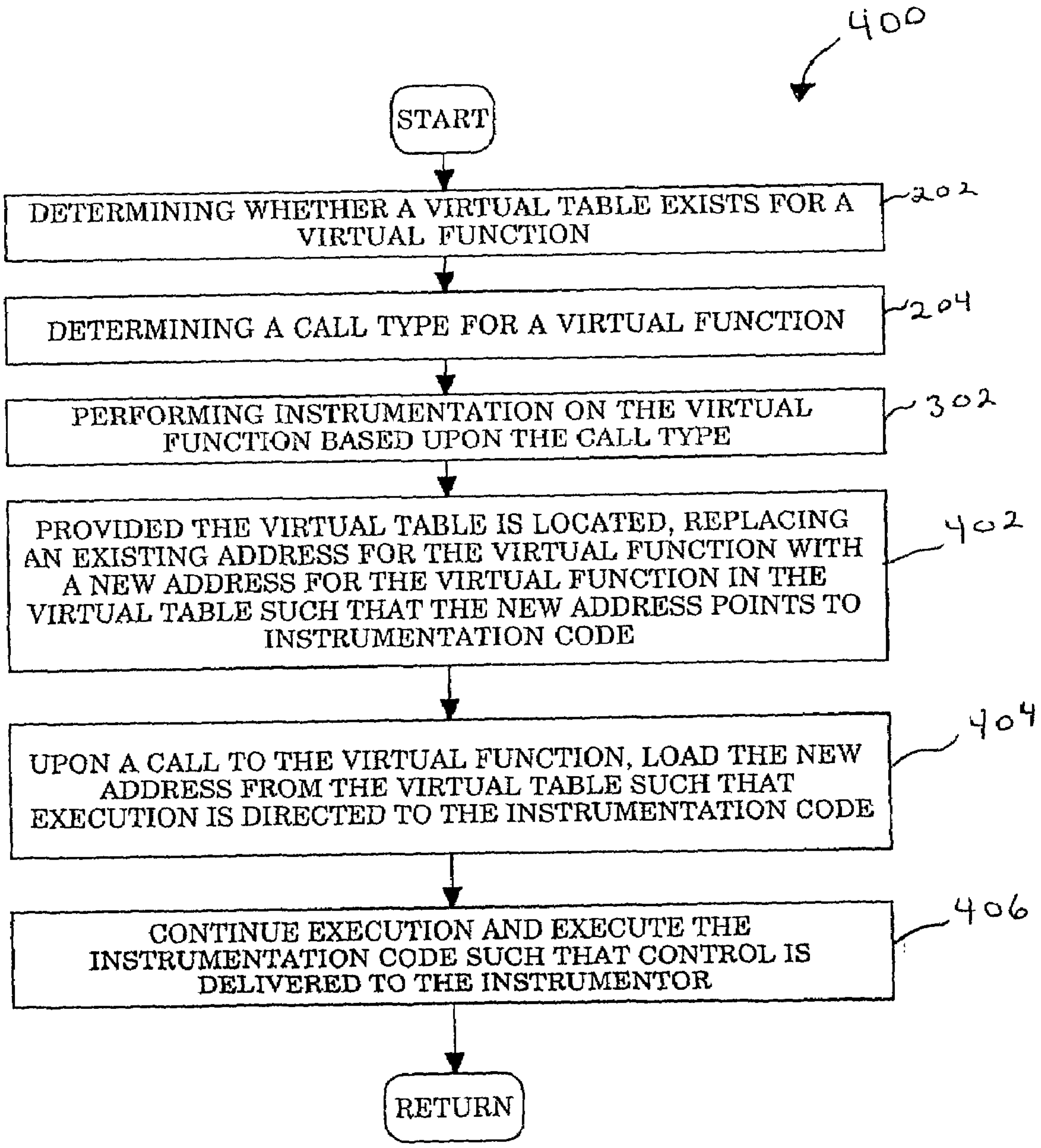
FIG. 4 is a flow chart of steps performed in instrumentation of a virtual function by readdressing a virtual table in accordance with one embodiment of the present claimed invention.

With reference now to FIG. 4, a flow chart 400 of steps performed in accordance with another embodiment of the present invention is shown. The method of the present embodiment includes steps 202, 204 and 302 of FIG. 3. These steps were described above in detail in conjunction with the description of FIGS. 2 and 3, and are not repeated herein for purposes of brevity and clarity. The method of the present embodiment as described in FIG. 4 also includes new steps 402, 404 and 406. At step 402, provided that a virtual table was located for the virtual function, the present embodiment replaces an existing address for the virtual function with a new address in the virtual table such that the new address points to instrumentation code. Also, the present invention is well suited to an embodiment in which the instrumentation code is dynamically created, and to an embodiment in which the instrumentation code is not dynamically created.

Still referring to step 402, in one embodiment, using the starting address of each virtual table, the instrumentor loads the data segment of the executable, which is where the virtual tables are stored in one architecture, and reads the corresponding location in the data segment to determine which functions are contained inside each located virtual table. In one embodiment, because shared libraries are relocated to new and varying addresses on loading of the library, the present invention performs some pointer manipulation to get the virtual address from the address stored in the data segment of the shared library. In such an approach, this offset (i.e. the pointer manipulation) is stored by the instrumentor during the loading of the library.

At step 402, the instrumentor provides instrumentation code. More specifically, in one embodiment, the instrumentor creates for each virtual function found in the virtual tables a single bundle or instruction in shared memory that only contains a breakpoint instruction or other control transfer instruction. Additional details related to instrumentation including discussion of features such as breakpoints or other control transfer instructions, branches, switch tables, procedure lookup tables (PLTs) can be found in co-owned, commonly-assigned U.S. patent application Ser. No. 09/833,248 filed Apr. 11, 2001, entitled "Dynamic Instrumentation Of An Executable Program", to Hundt et al. which is incorporated herein by reference as background material.

With reference still to step 402, the instrumentor of the present embodiment stores the virtual table information read from the data segment. The instrumentor then rewrites the virtual tables of the target process with a modified virtual table which contains the addresses of the breakpoints associated with each virtual function instead of the original virtual function start address. In one approach, the instrumentation code is comprised of an instruction set which will surrender control of the target process to the instrumentor.

Referring next to step 404, upon a call to the virtual function, in the present embodiment, the target process loads the new address from the virtual table such that execution is directed to the instrumentation code. That is, when the target process makes a virtual function call, it reads the contents of the virtual table to get the function start address. In this embodiment, instead of making an indirect call to the virtual function start address, the target process makes an indirect call to the breakpoint (created at step 402) which is intended to deliver control of the target process to the instrumentor.

With reference now to step 406, in one embodiment, the present invention then continues execution and executes the instrumentation code such that control is delivered to the instrumentor. In one embodiment, processor 104 of FIG. 1 in conjunction with instructions, residing, for example, in RAM 106, ROM 108, and/or data storage device 110, comprise an apparatus which operates to perform steps 402, 404, and 406.

Figure 5:
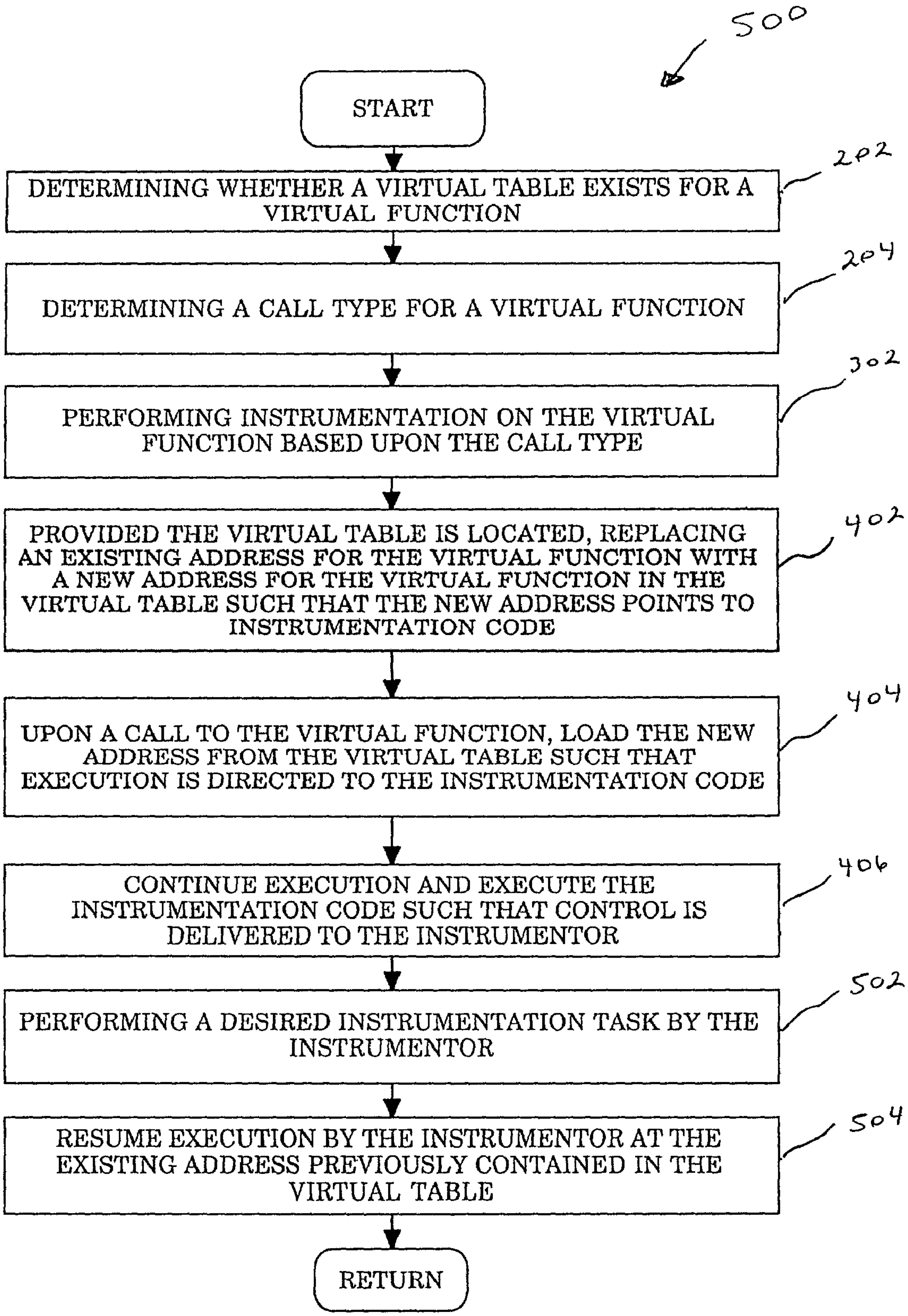
FIG. 5 is a flow chart of steps performed in instrumentation of a virtual function by readdressing of a virtual table and controlling execution via an instrumentor in accordance with one embodiment of the present claimed invention.

With reference now to FIG. 5, a flow chart 500 of steps performed in accordance with another embodiment of the present invention is shown. The method of the present embodiment includes steps 202, 204, 302, 402, 404, and 406 of FIG. 4. These steps were described above in detail in conjunction with the description of FIG. 4, and are not repeated herein for purposes of brevity and clarity. The method of the present embodiment as described in FIG. 5 also includes new steps 502 and 504. At step 502, the present embodiment performs a desired task (e.g. an instrumentation task) by the instrumentor. As an example, the present invention enables the instrumentor to, for example, increment a variable representing the virtual function. Although such specific examples are provided herein, the present invention is also well suited to having the instrumentor perform various other tasks.

With reference now to step 504, the present embodiment then resumes execution by the instrumentor at the existing address previously contained in the virtual table. That is, in this embodiment, the instrumentor, without doing any further modification to the target process, continues execution at the original virtual function entry point. In one embodiment, processor 104 of FIG. 1 in conjunction with instructions, residing, for example, in RAM 106, ROM 108, and/or data storage device 110, comprise an apparatus which operates to perform steps 502 and 504.

Figure 6:
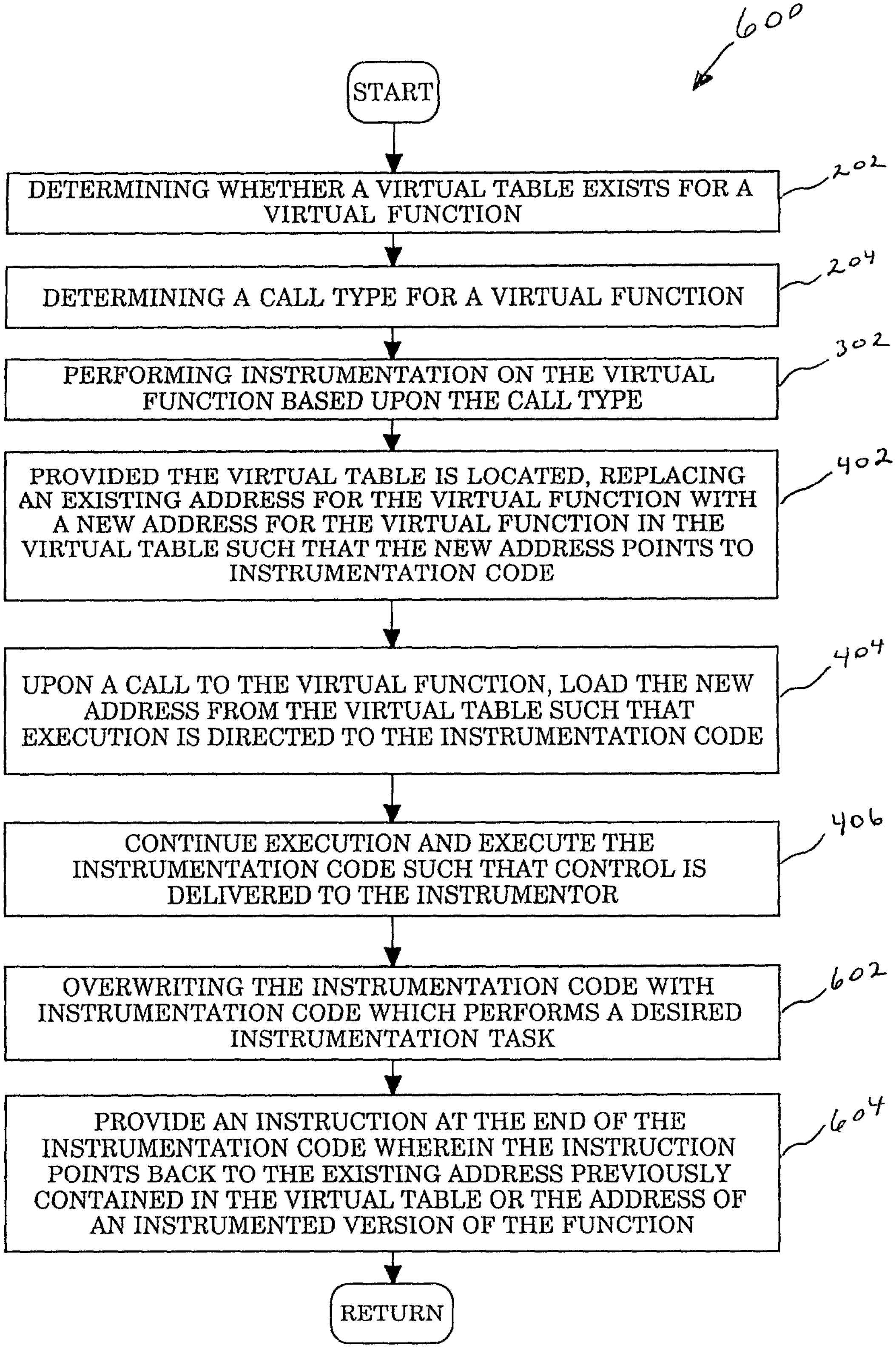
FIG. 6 is a flow chart of steps performed in instrumentation of a virtual function by readdressing of a virtual table and controlling execution via a target process in accordance with one embodiment of the present claimed invention.

With reference now to FIG. 6, a flow chart 600 of steps performed in accordance with another embodiment of the present invention is shown. The method of the present embodiment includes steps 202, 204, 302, 402, 404, and 406 of FIG. 4. These steps were described above in detail in conjunction with the description of FIG. 4, and are not repeated herein for purposes of brevity and clarity. The method of the present embodiment as described in FIG. 6 also includes new steps 602 and 604. At step 602, the present embodiment overwrites the instrumentation code with instrumentation code which performs a desired instrumentation task. That is, in the embodiment of FIG. 5, the instrumentor performs the desired instrumentation task and then the instrumentor resumes execution at the existing address previously contained in the virtual table. In the present embodiment however, instrumentation code (e.g. probe code) is added to the target process in the form of instructions which are written over the instrumentation code. The instrumentation code, when executed by the target process performs the desired instrumentation task. In one embodiment, the instrumentation task comprises incrementing a variable representing the virtual function. Although such a specific example is provided herein, the present invention is also well suited to providing instrumentation code which, when executed, performs various other instrumentation tasks.

With reference still to step 602, in another embodiment, the instrumentation code is provided at a new location. In one such embodiment, the instrumentor must then overwrite all virtual table entries associated with the virtual function to contain the address of the instrumentation code instead of the breakpoint.

At step 604, the present embodiment provides an instruction at the end of the instrumentation code wherein the instruction points back to the existing address previously contained in the virtual table or the address of an instrumented version of the function. In one example, the instruction at the end of the instrumentation code is comprised of a direct branch at the end of it to the virtual function start address. Thus, the present embodiment does not surrender or repeatedly transfer control of the target process to the instrumentor. In one embodiment, processor 104 of FIG. 1 in conjunction with instructions, residing, for example, in RAM 106, ROM 108, and/or data storage device 110, comprise an apparatus which operates to perform steps 602 and 604.

Figure 7:
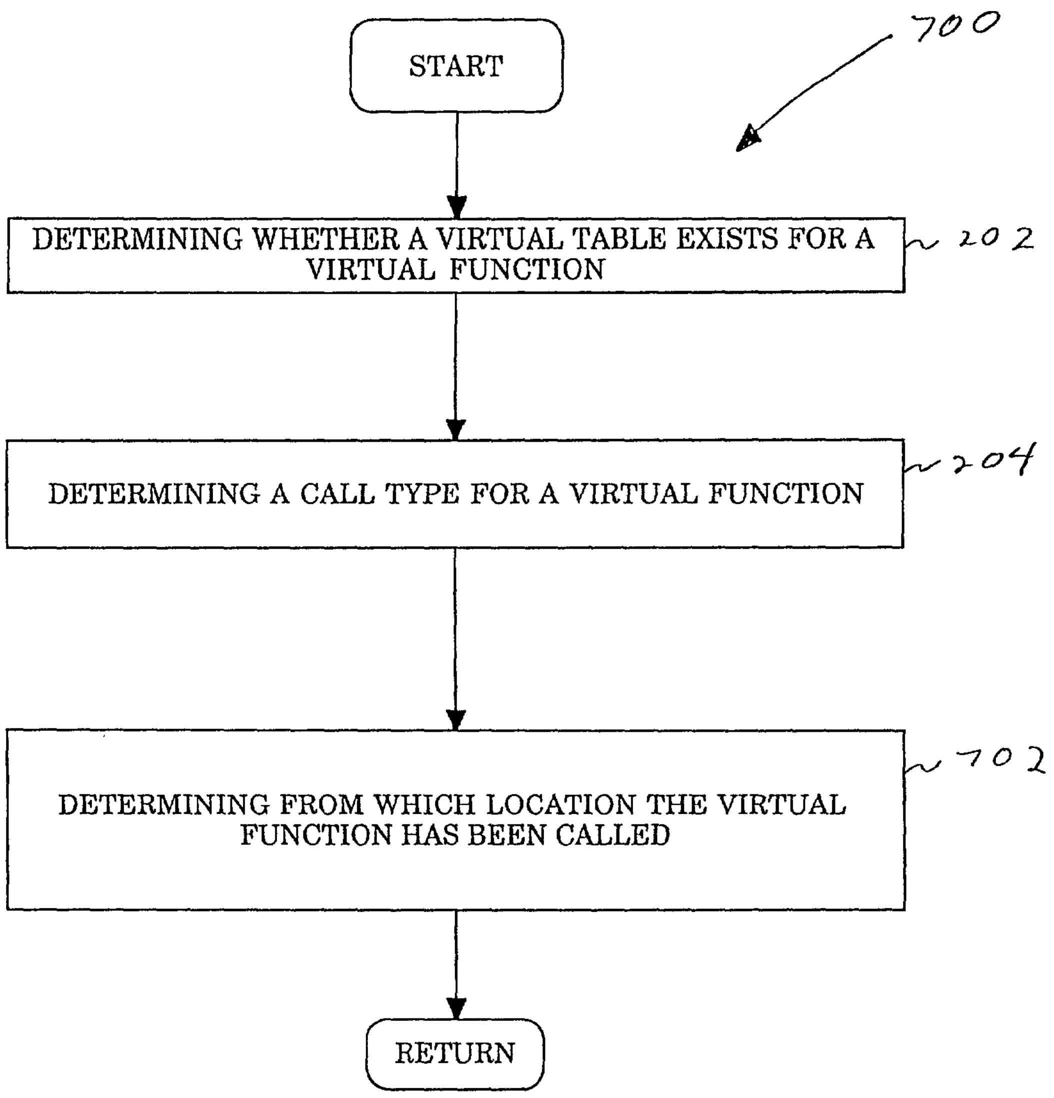
FIG. 7 is a flow chart of steps performed to determine a call type of a virtual function and to determine from which the virtual function has been called in accordance with one embodiment of the present claimed invention.

With reference now to FIG. 7, a flow chart 700 of steps performed in accordance with another embodiment of the present invention is shown. The method of the present embodiment includes steps 202 and 204 of FIG. 7. These steps were described above in detail in conjunction with the description of FIG. 7, and are not repeated herein for purposes of brevity and clarity. The method of the present embodiment as described in FIG. 7 also includes new step 702. At step 702, the present embodiment As yet another example, the present invention is also well suited to an embodiment which determines from which location the virtual function has been called. More specifically, in one embodiment, the instrumentor determines the location from which the virtual function has been called by examining the return pointer. Hence, the present embodiment is able to provide such valuable information to the programmer. In one embodiment, processor 104 of FIG. 1 in conjunction with instructions, residing, for example, in RAM 106, ROM 108, and/or data storage device 110, comprise an apparatus which operates to perform step 702.

Figure 8:
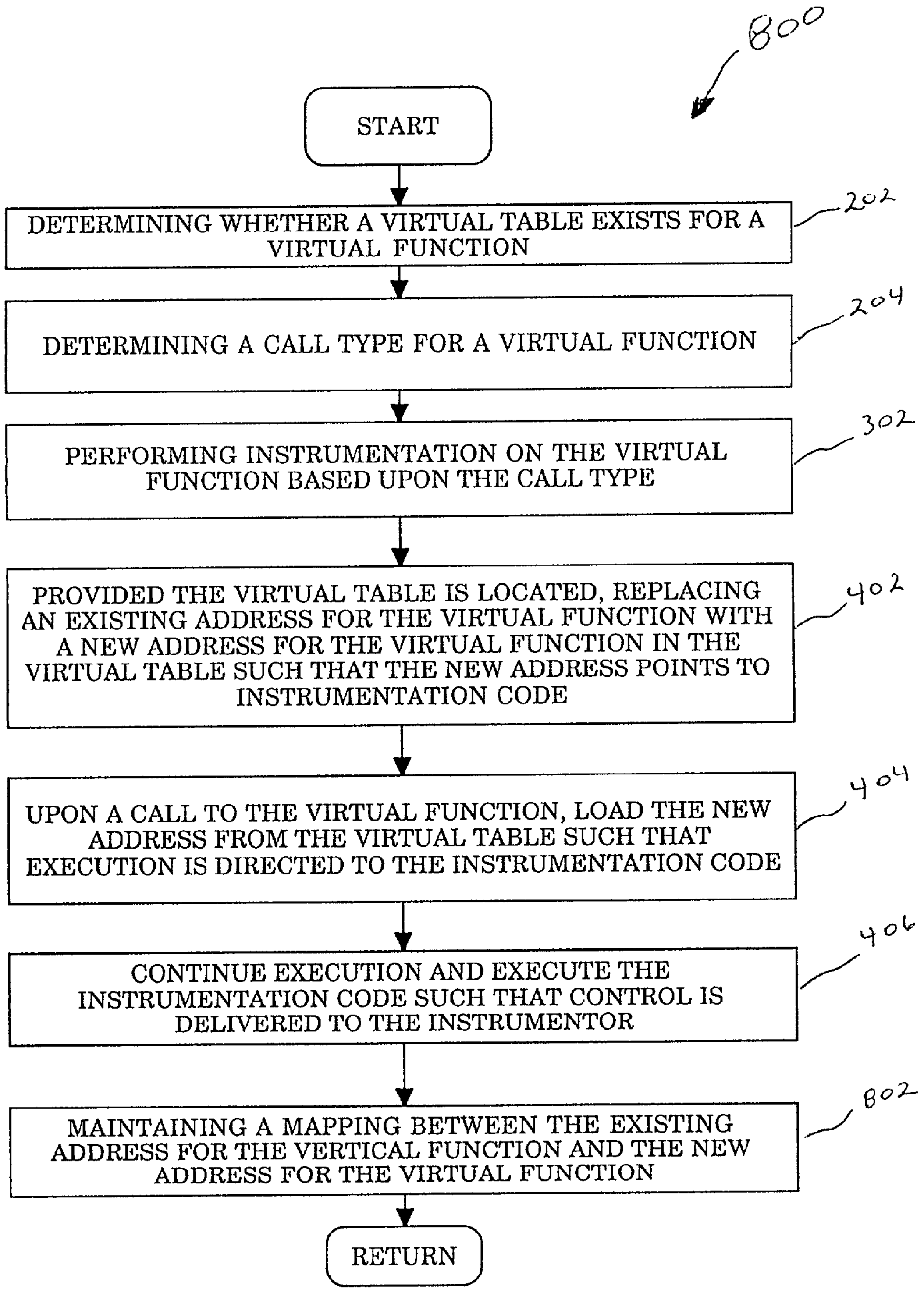
FIG. 8 is a flow chart of steps performed in instrumentation of a virtual function by readdressing a virtual table and maintaining a mapping of virtual tables addresses in accordance with one embodiment of the present claimed invention.

With reference now to FIG. 8, a flow chart 800 of steps performed in accordance with another embodiment of the present invention is shown. The method of the present embodiment includes steps 202, 204, 302, 402, 404, and 406 of FIG. 4. These steps were described above in detail in conjunction with the description of FIG. 4, and are not repeated herein for purposes of brevity and clarity. The method of the present embodiment as described in FIG. 8 also includes new steps 802. At step 802, the present embodiment maintains a mapping between the existing address for the virtual function and the new address for the virtual function. In so doing, the present embodiment enables the functionality recited above in step 402. That is, by maintaining a mapping between the existing address for the virtual function and the new address for the virtual function, the present embodiment enables the replacing of the existing address of the virtual function with the new address of the virtual function and also replacing of the new address of the virtual function with the existing address of the virtual function.

Hence, the present invention provides in various embodiments, accurate analysis of the number and type of virtual function calls and their callers. Such information is extremely valuable to software developers using object-oriented languages. Since virtual function calls are slower than direct function calls, by presenting this information to the developer the present invention helps gauge whether the software should be altered to change the virtual function call to a non-virtual function call. In an instrumentation tool which relocates the instrumented function into shared memory, various embodiments of the present invention achieve an actual performance improvement because without rewriting the virtual tables for the new function location, a virtual function call is made to the start address of the original function. The original function is then structured to make a long branch to the start of the instrumented function in shared memory. Hence, only one (i.e. the first) virtual function call is made in such embodiments.

Thus, the present invention provides a method and system for instrumenting a virtual function including determining the type of call made to the virtual function.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. A computer-implemented method for analyzing a virtual function, said method comprising:

locating a virtual table for a virtual function, said virtual table comprising a start address for said virtual function;

creating an instruction for said virtual function, said instruction comprising a control transfer function that directs execution to instrumentation code;

rewriting said virtual table with a modified virtual table comprising an address for said instruction instead of said start address;

loading said address for said instruction upon determining that a call to said virtual function is a virtual function call, thereby directing execution to said instrumentation code; and executing said instrumentation code to perform an instrumentation task for said virtual function.

2. The computer-implemented method for analyzing a virtual function as recited in claim 1 further comprising:

performing a desired instrumentation task; and resuming execution at said start address previously contained in said virtual table.

3. The computer-implemented method for analyzing a virtual function as recited in claim 1 further comprising:

overwriting said instrumentation code with instrumentation code which performs a desired instrumentation task; and providing an instruction at the end of said instrumentation code wherein said instruction points back to said start address previously contained in said virtual table.

4. The computer-implemented method for analyzing a virtual function as recited in claim 1 further comprising:

determining from which location said virtual function has been called.

5. The computer-implemented method for analyzing a virtual function as recited in claim 1 further comprising:

maintaining a mapping between said start address for said virtual function and said address for said instruction.

6. The computer-implemented method for analyzing a virtual function as recited in claim 1 wherein said instruction contains only a single breakpoint instruction.

7. A computer-readable storage medium embodying instructions that cause a computer to perform a method for analyzing a virtual function, said method comprising:

locating a virtual table for a virtual function, said virtual table comprising a start address for said virtual function;

creating an instruction for said virtual function, said instruction comprising a control transfer function that directs execution to instrumentation code;

rewriting said virtual table with a modified virtual table comprising an address for said instruction instead of said start address;

loading said address for said instruction upon determining that a call to said virtual function is a virtual function call, thereby directing execution to said instrumentation code; and executing said instrumentation code to perform an instrumentation task for said virtual function.

8. The computer-readable storage medium of claim 7 further comprising instructions that cause said computer to perform said method further comprising:

performing a desired instrumentation task; and resuming execution at said start address previously contained in said virtual table.

9. The computer-readable storage medium of claim 7 further comprising instructions that cause said computer to perform said method further comprising:

overwriting said instrumentation code with instrumentation code which performs a desired instrumentation task; and providing an instruction at the end of said instrumentation code wherein said instruction points back to said start address previously contained in said virtual table.

10. The computer-readable storage medium of claim 7 further comprising instructions that cause said computer to perform said method further comprising:

determining from which location said virtual function has been called.

11. The computer-readable storage medium of claim 7 further comprising instructions that cause said computer to perform said method further comprising:

maintaining a mapping between said start address for said virtual function and said address for said instruction.

12. An apparatus for analyzing a virtual function, said apparatus comprising:

means for locating a virtual table for a virtual function, said virtual table comprising a start address for said virtual function;

means for creating an instruction for said virtual function, said instruction comprising a control transfer function that directs execution to instrumentation code;

means for rewriting said virtual table with a modified virtual table comprising an address for said instruction instead of said start address;

means for loading said address for said instruction upon determining that a call to said virtual function is a virtual function call, thereby directing execution to said instrumentation code; and means for executing said instrumentation code to perform an instrumentation task for said virtual function.

13. The apparatus of claim 12 for analyzing a virtual function, said apparatus further comprising:

means for performing a desired instrumentation task by said instrumentor; and means for resuming execution by said instrumentor at said start address previously contained in said virtual table.

14. The apparatus of claim 12 for analyzing a virtual function, said apparatus further comprising:

means for overwriting said instrumentation code with instrumentation code which performs a desired instrumentation task; and means for providing an instruction at the end of said instrumentation code wherein said instruction points back to said start address previously contained in said virtual table.

15. The apparatus of claim 12 for analyzing a virtual function, said apparatus further comprising:

means for determining from which location said virtual function has been called.

16. The apparatus of claim 12 for analyzing a virtual function, said apparatus further comprising:

means for maintaining a mapping between said start address for said virtual function and said new address for said virtual function.

* * * * *